F. H. KNAPP & W. H. LEISTER.
CAN WRAPPING MACHINE.
APPLICATION FILED MAY 6, 1912.
1,135,294.
Patented Apr. 13, 1915.
9 SHEETS—SHEET 8.
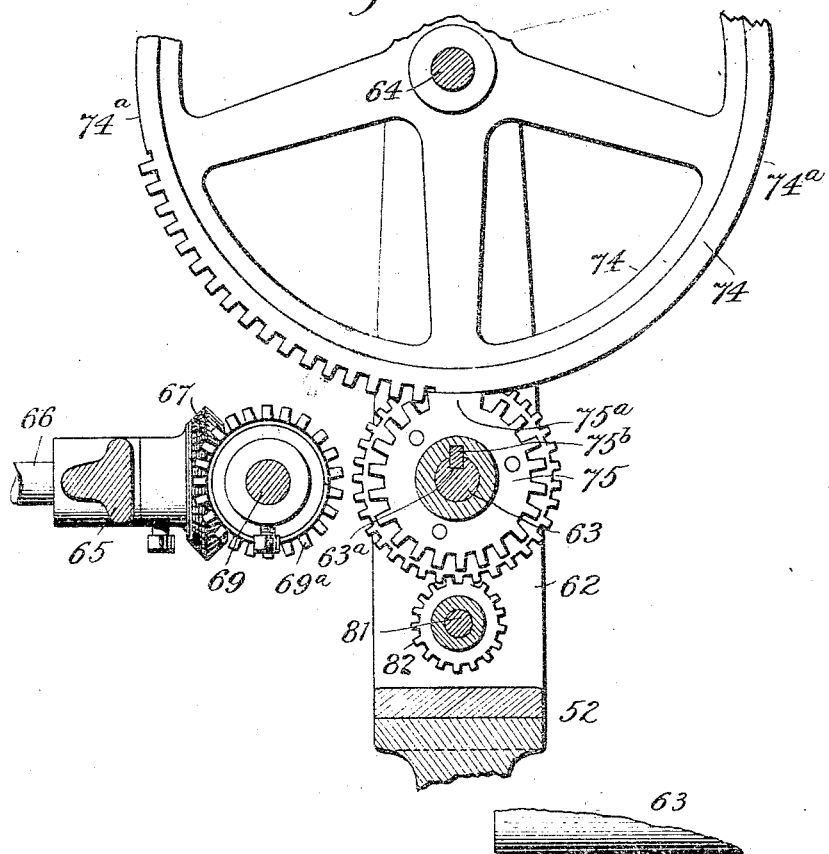
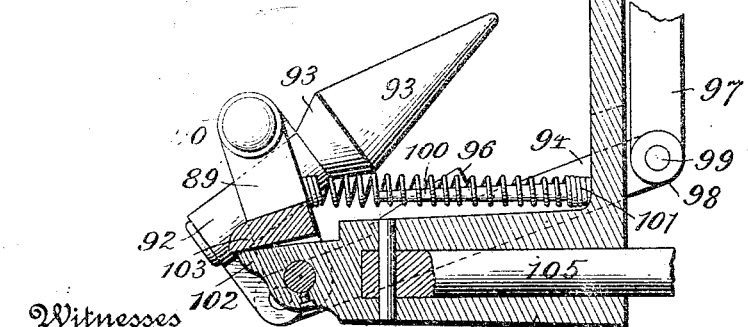

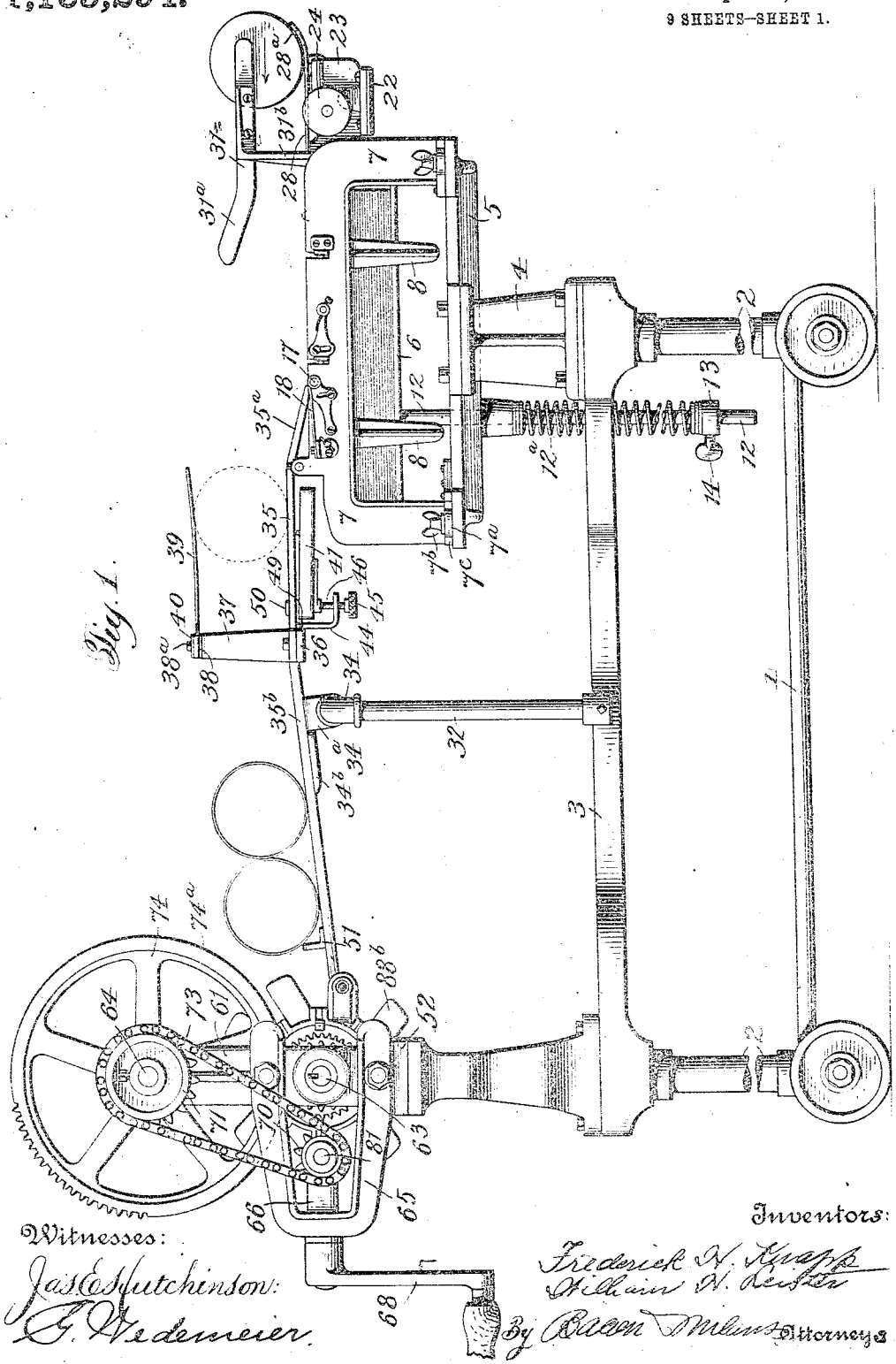

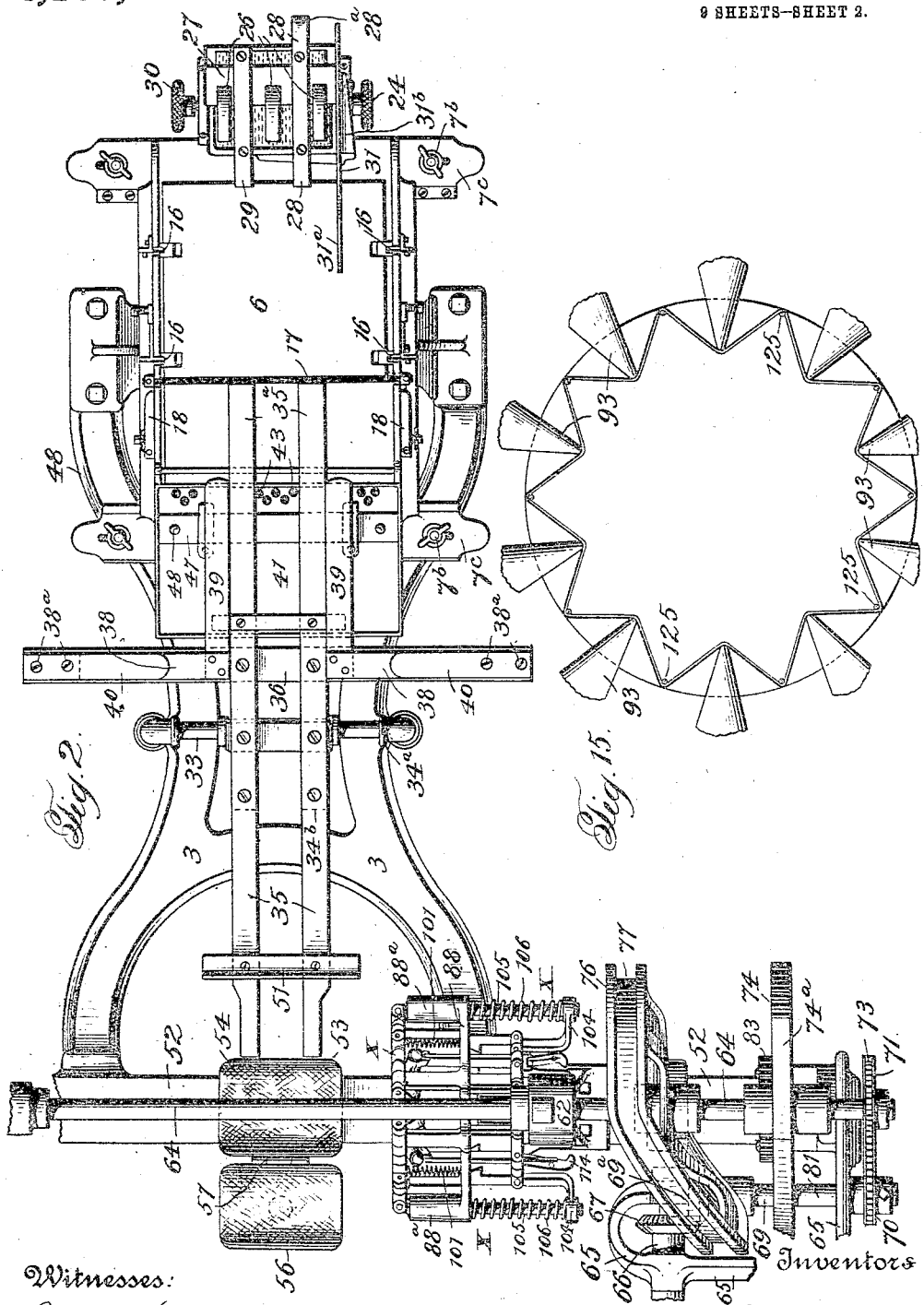

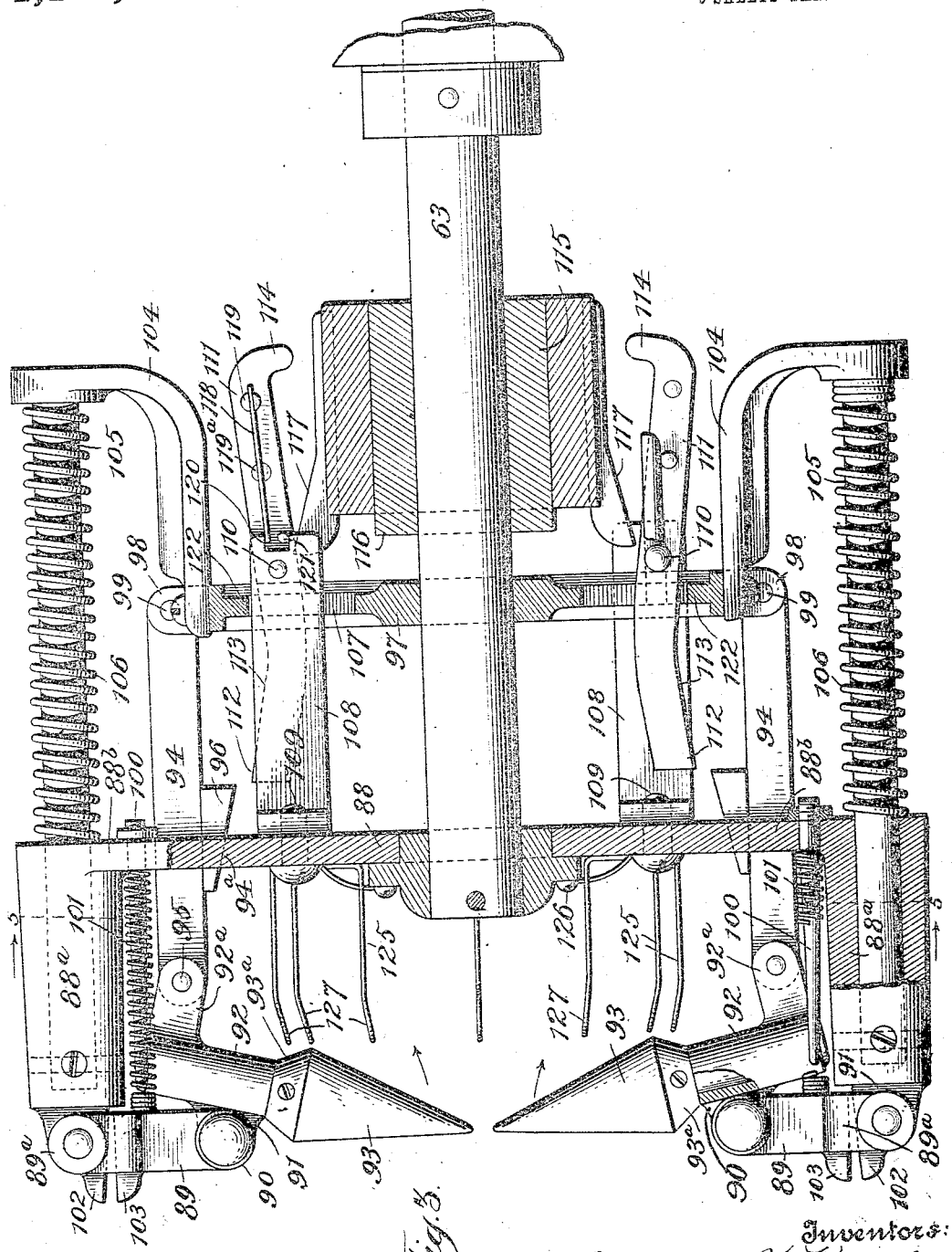

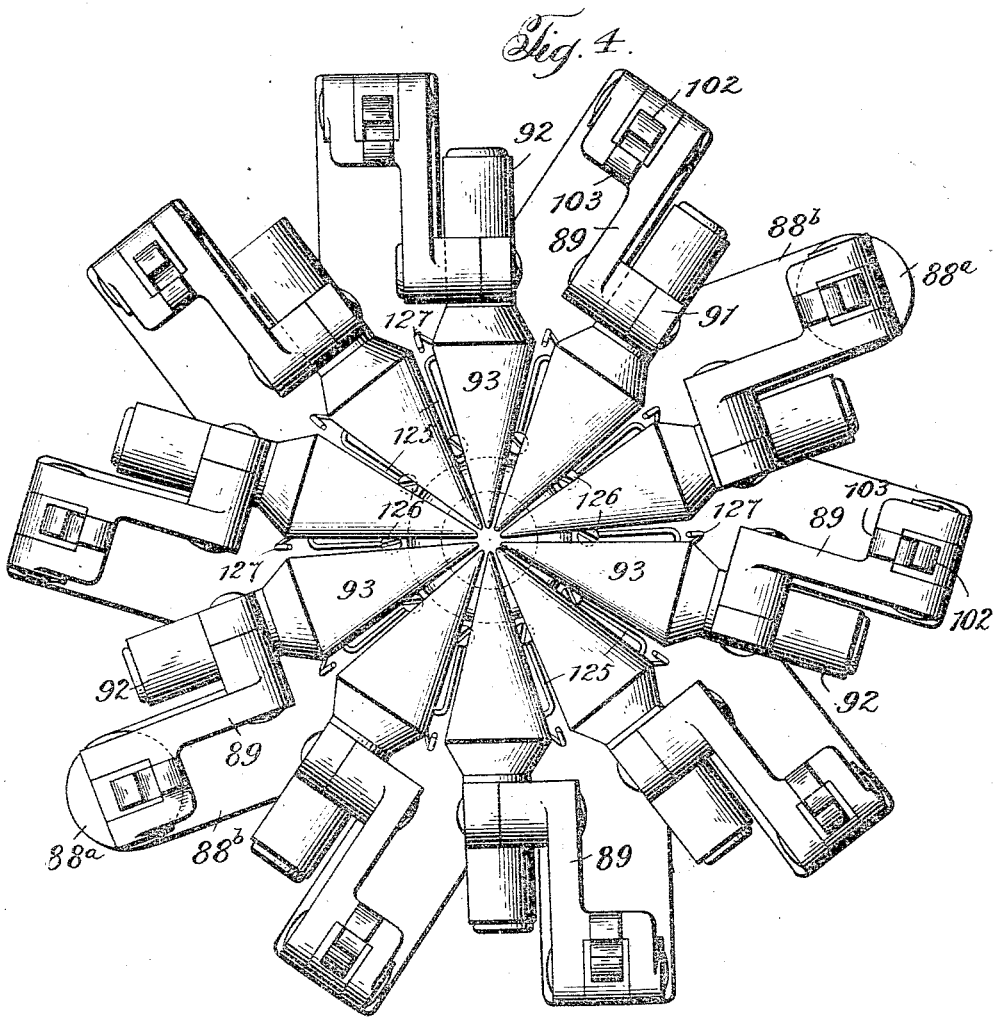

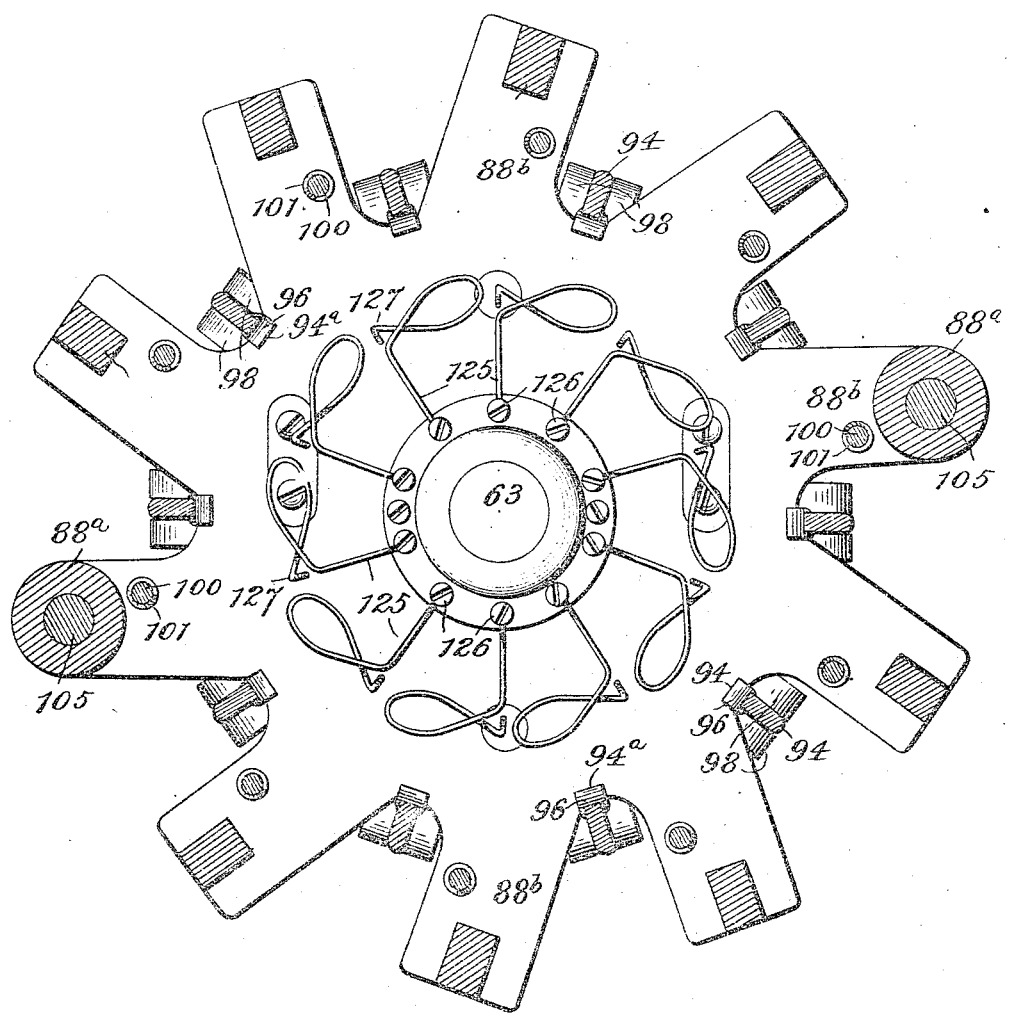

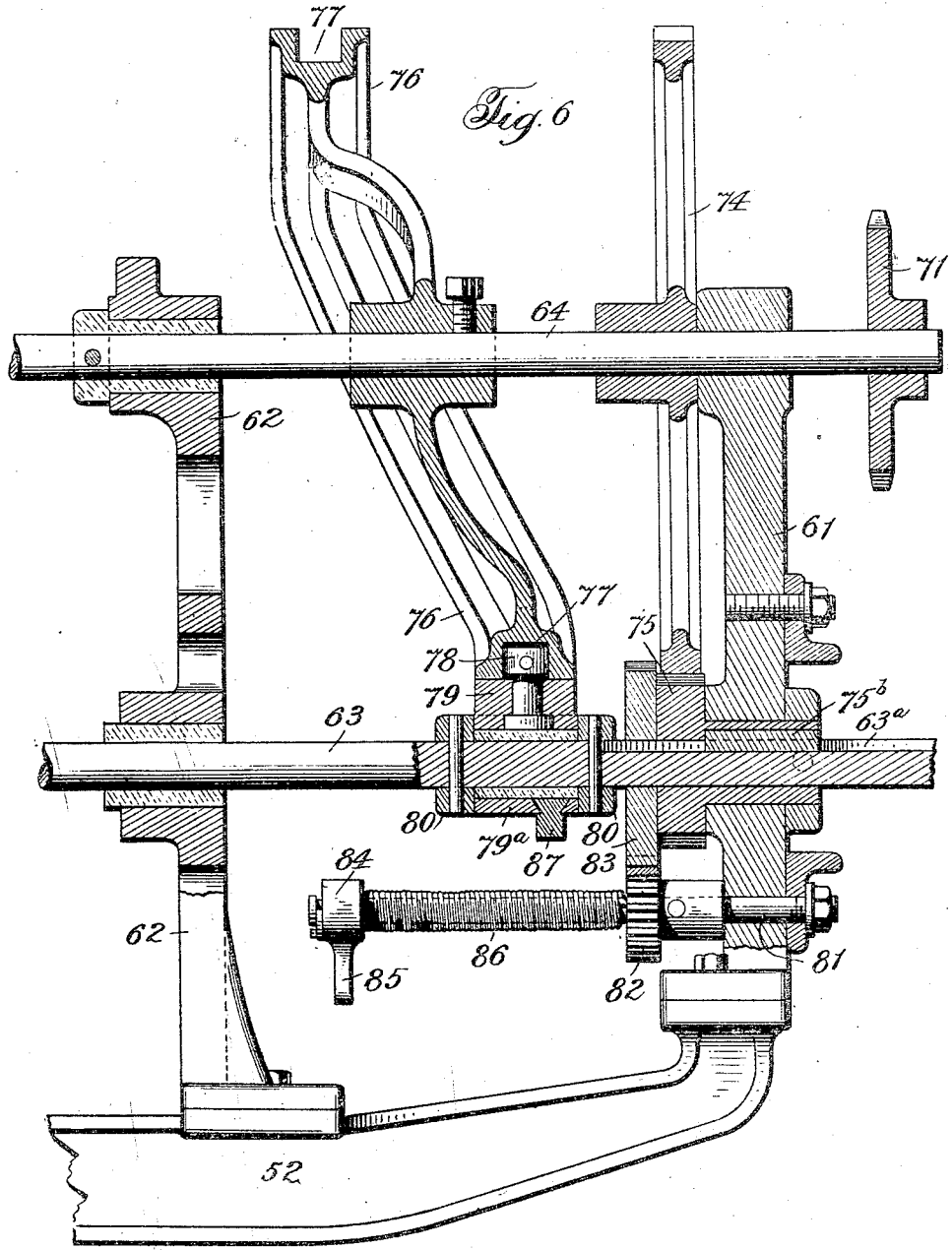

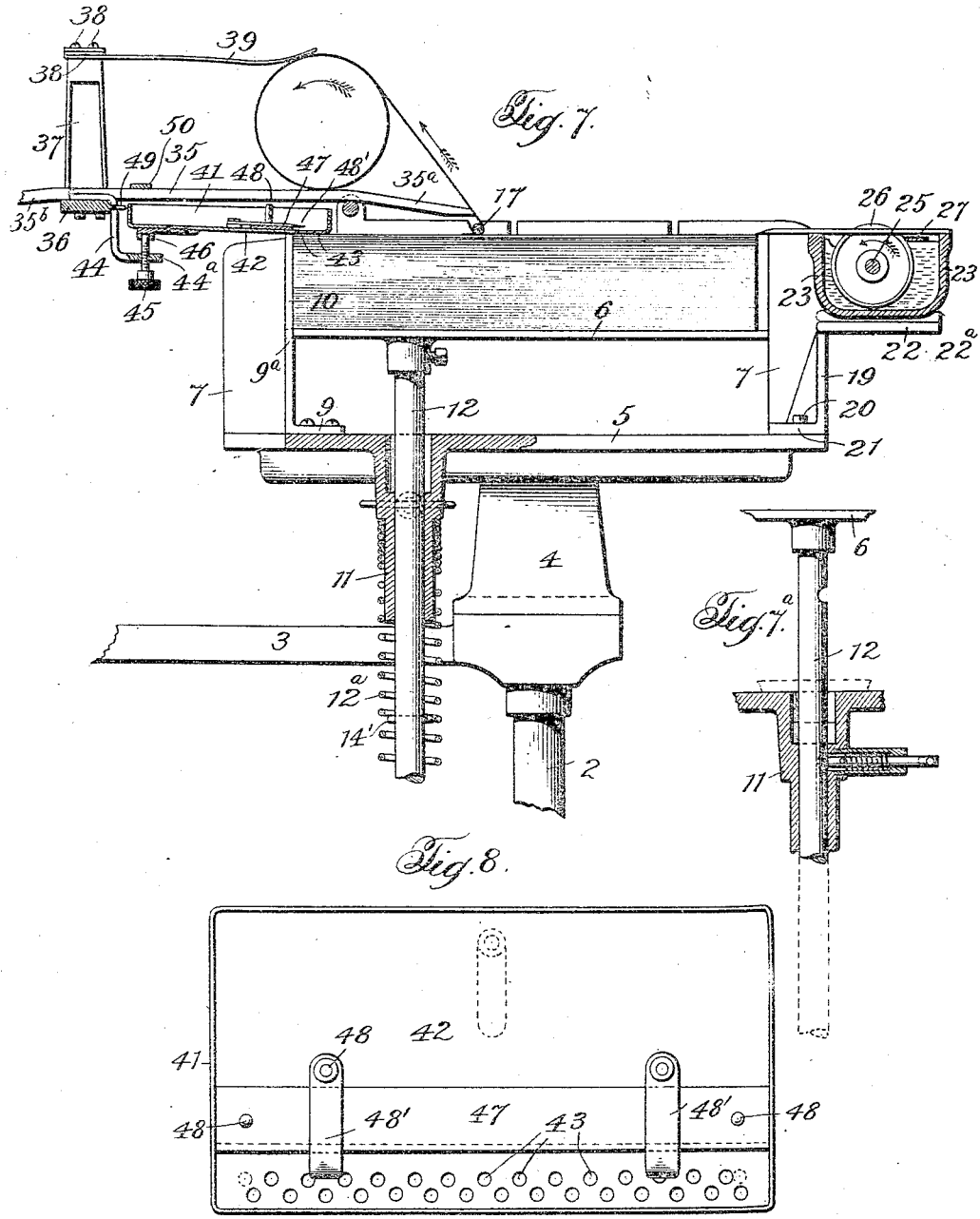

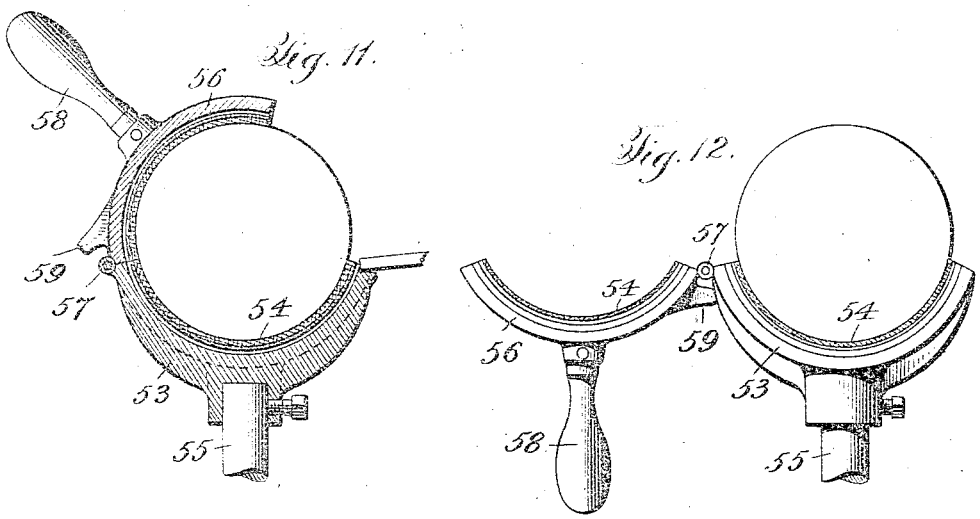
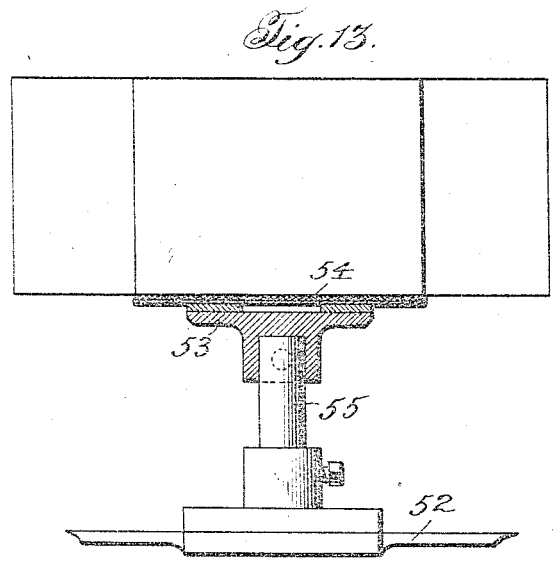
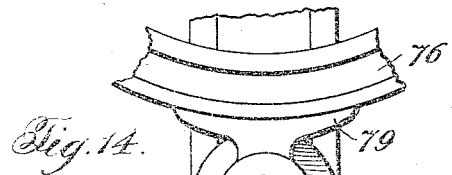

UNITED STATES PATENT OFFICE.

FREDERICK H. KNAPP AND WILLIAM H. LEISTER, OF WESTMINSTER, MARYLAND, ASSIGNORS TO FRED H. KNAPP COMPANY, OF WESTMINSTER, MARYLAND, A CORPORATION OF MARYLAND.

CAN-WRAPPING MACHINE.

1,135,294.          Specification of Letters Patent.      Patented Apr. 13, 1915.

Application filed May 6, 1912. Serial No. 695,430.

*To all whom it may concern:*

Be it known that we, FREDERICK H. KNAPP and WILLIAM H. LEISTER, citizens of the United States, residing at Westminster, in the county of Carroll and State of Maryland, have invented certain new and useful Improvements in Can-Wrapping Machines, of which the following is a specification, reference being had therein to the accompanying drawing.

This invention relates to machines adapted to apply a label or wrapper to the circumference of a can or the like and to fold the edges of the label over the ends of the can and flat thereagainst so as to provide on the can a wrapper extending substantially over the entire body thereof including its ends.

In the description and claims the term "can" or "cans" is to be construed as a general one applying to various types and forms of cartons and packages, the machine being susceptible of various adaptations and uses, and likewise the terms "label" and "wrapper" are to be considered as in substance the same, it being borne in mind that any suitable covering for the can whether in the nature of a label or not is embraced within these terms.

It is one of the primary objects of the invention to increase the efficiency, commercial practicability and durability of machines of the character mentioned and to insure a more compact and uniform fold of the wrapper flat against the ends of the can than has been possible with prior constructions, and with the result that the appearance of the wrapped can is greatly enhanced.

The invention aims more particularly to improve generally upon the construction of the machine embraced in the U. S. Patent 866223 to John Ritty, dated September 17, 1907 entitled "Machine for folding the ends of wrapper labels against the ends of cans".

With the above objects in view, the invention embraces two coöperating folding heads of novel construction adapted to act upon the projecting edges of an applied label at opposite ends of a can whereby both ends of the can are simultaneously wrapped.

It is further contemplated by the invention to provide a rotary head member having a cluster or annular series of movable folding arms adapted in their initial movement to engage the outer surface of the projecting edge of the applied label and to associate with said folding arm coöperating fingers adapted to engage over the inner surface of said projecting edge of the label, the two series of folding members being in effect oppositely acting in operation whereby one series folds inwardly while the other series folds outwardly thereby accomplishing a preliminary crimp or fold to the label. In the subsequent operation of the folding arms the projecting edges of the label which have been crimped as stated, will be pressed flat against the can ends, the folds being uniform and interlocking at the center of the can end.

It is a further object of the invention to construct the folding mechanism of a character adapted to yield when in operative engagement with the can end and to allow the individually folding arms to independently yield whereby to accommodate themselves to the folds and to any irregularity or unevenness in the can head.

Further it is the object of the invention to provide means for imparting sliding movement to the folding mechanism whereby to move the same toward and from the can end and to provide means for converting said longitudinal movement of the folding mechanism into a rotatable movement of the same whereby to compress the folded label against the can end and to associate with said means shock absorbing instrumentalities, thereby preventing injury to the parts during said operations.

Again it is contemplated by the invention to provide an improved form of pasting mechanism for the lap end of the body of the label, and further to improve upon the general arrangement, coöperative association and construction of the pasting, labeling and folding mechanisms.

Other improvements and novel details in the construction and arrangement of parts will be clear from the description to follow when considered in connection with the accompanying drawings forming a part hereof and wherein for the purpose of illustration is disclosed a convenient and satisfactory embodiment of the invention.

In the drawings: Figure 1 is a side elevation of the complete machine, Fig. 2 a top plan of the same, one of the folding heads and operating mechanism therefor being removed, Fig. 3 is an enlarged section of one of the folding heads, Fig. 4 is a front elevation of the same, Fig. 5 is a transverse section substantially on the line 5—5 of Fig. 3 looking in the direction of the arrow, Fig. 6 is a longitudinal section enlarged of the operating mechanism for the folding heads, Fig. 7 is a longitudinal vertical section enlarged of the label receptacle and associated paste applying mechanism, Fig. 7ª is a detail view of the label plunger member, Fig. 8 is a plan view of the lap end pasting mechanism, Figs. 9 and 10 are detail views of parts enlarged, Figs. 11, 12 and 13 are detail enlarged views of the can support or clamp, and Figs. 14 and 15 are detail views of parts enlarged.

Referring now more particularly to the drawings wherein like reference numerals designate corresponding parts throughout the several views, a main frame is provided, which may be of any suitable construction and in the illustration preferably includes a base part 1, mounted on suitable bearings, whereby the machine may be transported from place to place. Positioned on the base 1 are suitable upright bars or posts 2 connected at their upper end by a horizontally extending web 3. Positioned on the web 3 of the main frame and secured thereto as by bracket feet 4 at the forward end of the web is a suitable support 5 for the label and pasting mechanism to be described hereinafter.

The label support or rest preferably takes the form of a movable follower 6 arranged for vertical sliding movement between oppositely disposed longitudinally extending brackets 7 mounted on the support 5 as by offset feet 7ª resting upon said support 5. One or more vertically extending, preferably flat bars 8 project downwardly from one or both of the brackets so as to constitute guides for the label follower 6. The said bars 8 also constitute guides for the sides of the labels and an upwardly projecting relatively flat bar 10 secured at 9 to the support 5 projects through a slotted way 9ª in the rear end of the follower 6 to constitute a guide for the end of the follower as well as an abutment for the end of the labels positioned on the support. The bracket 7 may be laterally adjusted if desired whereby to accommodate for different sized labels as by securing bolts 7ᵇ passing through transversely extending slots in the offset seat 7ᶜ and engaging the support 5. The label follower 6 is preferably spring pressed whereby to automatically feed the labels and position the uppermost one to be engaged by the can to be labeled. A sleeve 11 projects downwardly from the support 5 and constitutes an extended guide for an elongated rod 12 secured to the under surface of the follower 6. Mounted upon the rod 12 is a suitable coil spring 12ª adapted to engage at its upper end said sleeve and at its lower end a collar 13 which latter is also sleeved upon the rod 12 and held in position as by a thumb nut 14, adapted to engage any one of a series of vertically spaced recesses in said rod 12, to the end that the tension of the spring may be regulated at will. The spring being connected at its lower end to the collar 13 will exert upward movement to the rod 12 and in turn to the label follower 6. The upward movement of the follower is limited by a suitable stop pin 14' on the rod 12 adapted to engage the fixed sleeve 11. Projecting inwardly from opposite sides of the bracket member 7 are suitable knife edges 16 adapted to engage over the edges of the uppermost label whereby to hold the same in place, while at the same time permitting the label to slip past the same in its application to the can. A suitable curling device, preferably a longitudinally corrugated bar 17 projects between the bracket member 7 and is preferably spring held in place as by springs 18.

The label pick up pasting mechanism is preferably made up as follows: A bracket 19 is secured to the support 5 as by bolts 20 engaging an offset foot 21 at the lower end of the bracket and has at its upper end a forward extension 22 constituting a support for a suitable paste receptacle 23 extending transversely of the machine. The forward extension 22 of the support has suitable end guides 22ª overlying the ends of the receptacle 23 and one of said guides has an apertured ear adapted for the reception of a bolt 24 having an operating knob at one end and adapted to engage at its opposite end the adjacent end of the receptacle 23 whereby to secure the latter in adjusted position on the support. Mounted in the receptacle 23, as by a shaft 25 having bearings at opposite ends in the end walls are one or more pasting members, preferably taking the form of metallic disks 26, separated from one another. A suitable scraper 27 is positioned on the top of the receptacle and is adapted to engage over the disks 26 whereby to regulate the quantity of paste taken up by the latter. Also positioned on the top of the receptacle 23 and secured thereto are oppositely disposed runways 28 and 29, one of which 28 has a curved forward terminal 28ª constituting an abutment or rest for a can and preventing the same from dropping off the forward end of the runway when positioned on the latter. The opposite end of each of said runways 28 and 29 are extended so as to bridge the space between the receptacle 23 and the label support. By loosening the bolt 24 the receptacle 23 may be adjusted whereby to regulate the relative position of the paste receptacle and label support, and the paste receptacle may be bodily removed as desired. The shaft 25 for the paste members may have a suitable knob 30 on a projecting end thereof whereby the pasting members may be rotated by hand as desired, so as to bring a fresh supply of paste uppermost on the pasting members in the starting of the machine. In this connection, however, after the machine has been placed in operation, the movement of each can over the paste rolls causes the latter to rotate and thereby present a new pasted surface or area to succeeding cans.

A suitable guide 31, preferably extends longitudinally of the machine, being secured to the paste receptacle 23 by an arm support 31$^b$ and overlying the label support whereby to position the can substantially centrally of the labels, and said guide having an upwardly turned end 31$^a$ so as not to interfere with the wrapping of the label about the can when the same is taken up by the latter in its movement.

Arranged substantially centrally of the web 3 of the main frame is a suitable support, including upwardly extending rods 32, one adjacent each side of the web and connected by a transversely extending rod 33 at the upper end thereof, as by a coupling member 34. Secured to the rod 33, as by ears 34$^a$ are suitable brackets 34$^b$ supporting elongated runway bars or members 35. Supported on said runway bars 35 and extending transversely of the machine is an elongated bar 36 having adjacent the opposite ends thereof upright supports 37 and mounted on said supports 37 are suitable transversely extending spring arms 38, one on each of said upright supports. Spring arms 39 project inwardly from the spring arms 38 extending transversely to the latter and longitudinally of the machine. The arms 39 are upwardly curved at their forward end so as to permit the can to readily engage under said arms in its rolling movement along the runway, and auxiliary spring arms 40 may be provided as a strengthening medium for the arms 38, the arms 40 overlying the arms 38 and being secured at one end as by bolts 38$^a$ which may also constitute the securing means for the arms 38.

The pasting mechanism for the lap end of the label will now be described. 41 is a suitable receptacle conveniently in the form of a pan having upright sides and a bottom 42, which latter is apertured at 43. The said apertures are preferably arranged in series extending from side to side of the machine, preferably two or more series being provided. The pan at its forward end overlies the rear ends of the labels positioned on the follower 6 and is adapted to rest on the pile of labels, as more clearly illustrated in Fig. 7. When in this position the apertures in the bottom of the receptacle are adapted to automatically feed paste from the receptacle to the lap end of the uppermost label. A downwardly projecting bracket 44 is secured to the transversely extending bar 36 and has an offset lower end 44$^a$ apertured for the reception of a threaded thumb bolt 45. The bolt 45 engages at its upper end the rear end of a suitable boss 46 on the lower surface of the paste receptacle 41 at the rear thereof. The receptacle 41 is adapted for the reception of liquid paste and is preferably in the nature of a gravity feed, the rear end thereof being adapted to be elevated relative to the forward or outlet end, as has been seen. As the supply of paste is reduced, the rear end of the receptacle is elevated by imparting rotary movement to the bolt 45. The supply of paste may also be regulated by employing a slidable cut-off 47 positioned in the receptacle 41 and preferably extending from side to side thereof. Suitable hand pieces 48 project upwardly from the cut-off 47 and are adapted to be grasped whereby to impart backward or forward sliding movement to the cut-off 47 to open or close one or more series of openings in the bottom of the receptacle. Should the machine not be in use, all of said apertures may be closed by the cut-off. Suitable spring guides 48 are secured to the bottom of the receptacle and overlie the cut-off whereby to hold the latter in place. Abutment pins 49 at the rear edge of the receptacle engage the transverse bar 36.

The main portion of the runways take the form of suitably supported separated bars, and are more clearly illustrated in Fig. 1. These runway bars are given the numeral 35, and preferably incline upwardly at 35$^a$ for a short distance from a point adjacent the curling bar on the label support, thence in a straight horizontal line, and finally project downwardly at an incline 35$^b$ to a point adjacent the folding mechanism to be hereinafter described. The runway has a transverse stop 50 on its upper surface, adjacent the rear end of the spring arms 39, and an auxiliary stop 51 on the upper surface of the downwardly projecting part of the runway adjacent the rear end thereof. The spring arms 39 serve to temporarily retard the movement of the can on the runway and the stop 50 limits said movement at a time when the lapped portions of the label on the can are uppermost. In this position the projecting edges of said lapped portions of the label are more accessible to the hands of the operator, it being contemplated in the present embodiment of the invention to paste the projecting edges of the lapped portions of the label by finger pressure. That is to say, the operator places a thumb or finger of one hand over the projecting edge of the lapped portion of the label and another finger underneath said projecting lapped portion and by applying pressure and sliding the fingers toward the edge of the label the said projecting lapped portions are forced into binding contact. Simultaneously the other end may be used to secure the projecting edges of the lapped portion of the label at the opposite end of the can. The stop 51 adjacent the rear end of the runway serves to interrupt the movement of the cans at a point adjacent to or forwardly of the folding mechanism where the can with an applied label may be grasped by the operator and inserted in position to be operated upon by the folding mechanism.

The means for supporting the cans during the folding operation is preferably mounted on a support 52 extending transversely relative to the machine and secured to the web 3 of the main frame. Positioned substantially intermediate the ends of the support 52 and preferably in alinement with the can runway and extending transversely thereto is the can receiving support or rest 53, the same being preferably segmental in shape so as to conform to the curvature of the can. The support or rest 53 may have a yieldable surface 54 and is adjustably mounted on the transversely extending support 52 in any desired manner, as by the vertical adjustable bar 55. It is desired to maintain the can stationary on its support while the label or wrapper is being folded about its end or head, and to this end a suitable presser member or clamp is provided adapted to coöperate with the segmental rest 53. The clamp is pivoted at 57 to the support 53 and projecting outwardly and upwardly therefrom is an elongated bar taking the form of a handle 58, which latter it will be observed projects outwardly to a point beyond the folding mechanism whereby the hand of the operator when in position on the bar will be protected from contact with the folding mechanism. When it is desired to place a can on the support 53 or to release the can after the folding operation the operator draws the operating handle 58 outwardly when the clamp 56 will drop downwardly by gravity. On the other hand, by pressing inwardly on the handle 58 the can will be held in fixed position. A stop 59 projects outwardly from the clamp 56 adajacent its pivotal connection thereby limiting the downward movement of the clamp by engaging the outer surface of the support 53. The handle in this last mentioned position of the clamp will also be maintained in position to be readily grasped by the operator.

The folding mechanism for the projecting edges of the label is of a character preferably to simultaneously act on the projecting edges of the labels at the opposite ends of the can. The folding mechanism takes the form of two oppositely disposed heads or frames having each a cluster of folding members, the two sets of folding mechanism being coupled up, one with the other, in a manner to be described. Since the two folding heads are duplicates, one of the other, but one set of said parts is illustrated, and only so much of the driving mechanism for the coöperating parts interposed between the two heads as will be necessary to a clear understanding of the operation. It is to be noted in this connection, however, that it is within the spirit of the invention to fold the edge of the label or wrapper about each end of the can separately, in which event but one set of folding mechanism may be employed.

Adjacent each end of the transverse support 52 is an upright bracket 61 and adjacent thereto an auxiliary upright bracket 62. Supported on each pair of said brackets is an elongated shaft 63, mounted for rotary and slidable movement, the said shafts 63 projecting inwardly beyond the bracket 62. An auxiliary shaft 64 which may be termed the main or drive shaft is arranged above the shafts 63 and is substantially coextensive with the support 52. A gear frame 65 is supported at one end of the support 52 and mounted on the frame 65 for rotary movement is a stub shaft 66 having at one end a bevel gear 67 and at its opposite end an operating handle 68. An auxiliary stub shaft 69 is supported on the frame 65, the same extending at right angles to the shaft 66 and having at one end a beveled gear 69$^a$ coöperating with the gear 67 and having at its opposite end a sprocket wheel 70. An auxiliary coöperating sprocket wheel 71 is provided on one end of the shaft 64. Upon said sprocket wheels is mounted a drive chain 73 with the result that when the handle 68 is moved the drive shaft 64 is rotated.

The folding heads proper are designated generally by the character X. The same are adapted for both slidable and rotatable movement, a slidable movement to properly position the heads and folding members carried thereby relative to the projecting edges of the label at the ends of the can and to fold said labels against said ends, and a rotary movement whereby the folding members will iron or smooth out the folds of the label to the end that the same will lie flat against the ends of the can. During the sliding movement of the heads they are held from rotation.

While we have illustrated hand operating means for the shaft 64, it is within the contemplation of the invention to provide power actuating means, and the folding heads get both the sliding and rotary movements from said shafts 64 through the medium of the shaft 63 in a manner to be now described.

The shaft 64 has fixed thereto adjacent opposite ends a gear wheel 74 adapted to mesh with a gear pinion 75 on the shaft 63. The gear wheel 74 has a smooth toothless portion 74ª, and the pinion 75 a toothless portion 75ª. Therefore it will be seen that when the toothed portions of the gear members are in mesh the heads which are mounted on the shafts 63 will rotate while they are free from rotation when the toothless portions of said wheels are in registration. While the pinion 75 is fixed to rotate on the shaft 63 at the same time the connection permits of a relative longitudinal sliding movement of the shaft 63 and with it the connected head X. This connection includes a key 75ᵇ on the wheel 75 and a longitudinal slot 63ª in the shaft 63.

The means for imparting sliding movement to the shaft 63 and with it the heads X includes a cam disk 76, one adjacent each end of the shaft 64 having in its periphery a groove 77 adapted to receive a lug or shoe 78 projecting inwardly from a member 79 having a collar 79ª fitted to the shaft 63 for longitudinal movement therewith as by retaining collars 80 keyed to the shaft 63. The cam groove 77 is of such a character that when the teeth of the gear wheels 74 and 75 are in mesh the shoe 78 will be in engagement with a substantially straight portion of the groove whereby the shoe 78 and the connected shaft 63 are held from longitudinal movement. When, however, the smooth portion of the gear wheel peripheries are in registration the offset portion of the cam groove 77 engages the shoe 78 and imparts longitudinal movement to the shaft 63 whereby the movement of the shaft 63 with the connected head X is changed from a rotary to a sliding movement. When the shaft 63 with the head X reaches the limit of its backward movement the same has imparted to it by the cam groove 77 and shoe 78 a reverse sliding movement.

A suitable shock absorber is provided to offset the strains on the head and associated parts, due to the sudden change from a rotary to a sliding movement in the manner above described, the same preferably including a shaft 81 having a bearing at one end in the upright bracket 61 and projecting inwardly. Mounted on the shaft 81 for movement therewith is a gear wheel 82 adapted to mesh with a gear wheel 83 fixed to the gear wheel 75ᵇ. Sleeved upon the shaft 81 by a collar 84 is a dog 85, and also sleeved upon the shaft 81 is a coiled spring 86 connected at one end to the gear wheel 82 and at its opposite end to the collar 84. Projecting from the collar 79ª is an abutment 87 which in the innermost position of the shaft 63 is in vertical alinement with the dog 85. The action of the shock absorber is substantially as follows: When the teeth of the gear wheels 74 and 75 are in mesh, rotary movement is imparted to the gear wheel 82 through the wheel 83 whereby the spring will be wound and placed under compression, the dog 85 being in engagement with the abutment 87, thereby forming a fixed connection for one end of the spring. Now when the shaft 63 reaches its limit of rotation, and the cam groove engages the shoe to impart sliding movement to the shaft 63, the initial sliding movement of the shaft 63 disengages the dog 85 from the abutment 87 thereby permitting the spring to rebound and take up the shock of the parts operatively connected to the head.

The folding heads X are preferably constructed as follows: On the ends of the shafts 63 and fixed thereto is a disk shaped carrying head 88 preferably taking the form of a star having an annular series or cluster of folding arm supports 88ª extending inwardly from the projecting points 88ᵇ. Pivoted to the free end of said members 88ª is a link 89 having a forked end 89ª engaging over the end of said member 88ª. The link 89 has a boss 90 projecting from the side thereof and constituting a bearing for a hanger 91 connected intermediate the ends of a tubular support 92 for the shaft end of the conical folding members 93.

The folding members 93 have a reduced oppositely inclined end 93ª forming a shoulder which in the operation of the folding members is adapted to engage over the peripheral flange at the ends of the cans for a purpose to be described.

The shafts of the folding members 93 are fixed to their supports 92 against accidental separation but are free to rotate about their own axis. Each of the tubular members 92 has a bifurcated part 92ª adapted to receive the end of a rod 94 and being pivoted thereto as by a pintle 95. The said rods 94 project rearwardly in recessed portions 94ª of the supporting disk member 88 and have an inclined or cam projection 96 adapted to engage the base of said recess. An auxiliary disk member 97 which may be termed an actuating head is positioned on the shaft and has an annular series of spaced ears 98 for the reception of the rear end of the rods 94, which latter are pivotally connected between said ears, as by pintles 99. Bars 100 project inwardly from the star points 87ª of the supporting disk 88 and mounted on the bars are coiled springs 101 engaging at one end the disk 88 and connected at the opposite end to the links 89. Coöperating lugs 102 and 103 are provided, one on the fixed arm 88ª and the other on the link 89 and when said abutments are in engagement the arm 89 is substantially in fixed relation to the members 88ª whereby the pintle 91 constitutes a pivot or axis about which the folding arm may swing. Brackets 104 project rearwardly and upwardly from the disk member 97 and have an aperture therethrough adapted to constitute a loose support or guideway, for one end of a rod 105, which said rod is secured at its opposite end to one of the arms 88ᵃ. Positioned on said rod 105 and bearing at its opposite ends against the bracket 104 and the member 88ᵃ is a coil spring 106. Preferably two of said rods 105 and springs 106 are employed at opposite sides of the head. The disk member 97 has one or more cut-out portions 107 and projecting rearwardly from the disk member 88 are longitudinally extending bracket arms 108 secured to said disk member 88 as by bolts 109. It has been seen that the disk member 88 is movable relative to the disk member 97 and in said relative movement the bracket arms 108 loosely project through the cutout portions 107 in the disk member 97. Pivotally mounted adjacent the outer ends of the bracket arms 108, as by pivots 110, are elongated latch arms 111 having at one end a locking latch part or edge 112 connecting with an inclined portion 113. Said latch arms have at their opposite ends an inwardly projecting lug 114. Fixed to the main frame of the machine is a collar 115 loosely sleeved on the shaft 63, the said collar having a projection 116 constituting an abutment to be engaged by and to limit the movement of the disk member 97, and projecting from opposite sides of the collar 115 are inclined ways 117 arranged in the path of the projections 114 of the latch arms 111. A spring arm 118 is connected to each latch member at its outer end through the medium of a boss 119 and intermediate its ends, as by a boss 119ᵃ, each of which projecting from one side of said latch member. The spring is free at its inner end and is adapted to rest in a recess 120 in the end of the bracket member 108. A stop pin 121 projecting from the side of the latch arms 111 also engages in said recess of the bracket member 108, the spring being adapted to engage one wall of said recess whereby to force the rear end of the latch member downwardly, while the stop pin 121 engages the opposite wall of said recess to limit the downward movement of the latch member about its pivot 110. The action of the spring member is to force the locking edge 112 of the latch member upwardly and the opposite rear end of said member downwardly so that in the movement of the disk member 88 relative to the disk member 97, the inclined portion 113 of the latch member will cause the latter to tilt by engaging the wall of the opening 107 in the member 97 and so soon as the inner or locking edge of the latch passes beyond said wall the same will be forced outwardly to engage behind the wall at 122.

An annular series or cluster of spring fingers 125 are positioned on the carrying head 88, the same being secured to the latter as by screws 126, and having inwardly bent terminals 127 whereby when the coöperating folding mechanism is in position to fold the edge of the label the spring fingers engage over the inner surface of the projecting edge of the labels. The spring fingers are arranged alternately relative to the folding arms 93.

The operation of the folding mechanism will now be described. It being assumed that the projecting edges of a label on a suitably supported can had been folded, and it is desired to iron or smooth the creases flat against the can, the folding arms 93 are at this time in the position illustrated in Figs. 3 and 4, and because of the peculiar construction of the operative portion of said arms 93 the latter lie flat against the can end from the periphery of the can to a point adjacent the center, and this whether or not the can is provided with the usual peripheral flange at its end, the reduced portion 93ᵃ being adapted to overlie said flange. Rotary movement being imparted to the head 88 and in turn to the connected arms 93, the arms 93 being in frictional contact with the wrapped ends of the can are caused to rotate about their own axis and smooth out the folds as far as possible. The arms 93 being spring supported by the springs 101, and the head itself by springs 106, these parts are adapted to yield in operation. The wrapped end of the can having been ironed and compressed flat against the can end, slidable bodily movement is imparted to the heads rearwardly away from the can through the medium of the cam groove 77 on the cam disk 76 and the coöperating shoe 78 of the shaft 63 which supports the head. This sliding movement of the head 88, together with the projections 88ᵃ thereon will, because of the connection with the disk shaped member 97 cause rearward movement of the member 97 with the member 88. It has been seen, however, that the member 88 has independent movement relative to the member 97 and in the rearward movement of the member 97 the same will meet with the obstruction or stop 116, thereby interrupting the movement thereof while permitting continued rearward sliding movement of the shaft 63 and the disk member 88. In this continued movement of the member 88, the link 89 is drawn rearwardly, the abutments 102 and 103 of said link and the member 88ᵃ contacting and the cam member 96 being engaged by the cam way 94ᵃ of the arm 94 will lift the arm 94 whereby to lift the supports 92 of the conical folding arms 93 beyond their dead center with the result that in further rearward movement of the link 89 with the projection 88ᵃ of the member 88, the folding arms 93 will move in the direction of the arrow in Fig. 3 about the pivotal connection 90 to the position illustrated in Fig. 10. As the disk member 88 approaches its rearmost position, the latches 112, due to the action of the spring 118 will engage behind the locking projection 122 of the member 97. In the rearward movement of the member 88, after the member 97 is in contact with the stop 116 it will be observed that the springs 112 are compressed. Now in the reverse longitudinal movement of the shaft 63, by reason of the locking engagement between the latch 112 and locking projection 122, the two heads 88 and 97 will move together until the opposite end 114 of the latch engages the inclined way 117 mounted on the main frame thereby swinging the latch about its pivot 110 and releasing the same from engagement with the member 122. Upon being released, the heads 88 and 97 are separated by the expansion of the springs 106, and in this movement the cams 96 ride over the wall of the recess 94ª of the member 87, and the conical folding arms 93 are moved about their pivot into the position illustrated in Fig. 3, it being observed in this connection that before the conical members 93 move to the position illustrated in Fig. 3 they engage the outer surface of the projecting edges of the labels while the intermediate spring fingers 127 engage the inner surface of said projecting edges of the labels whereby to initially fold or crimp said projecting edges, and by the continued movement of the folding arms 93 about their pivots the edges of the label are freed from the spring fingers 127 and forced into contact with the can end.

A brief review of the operation of the entire machine follows. The operator imparts rotary movement to the pasting members 25 whereby to bring a fresh supply of paste uppermost, and a can is positioned on the runway bars 28 and 29. The can being properly positioned and guided by the side guide 31, sliding movement is imparted to the can over the pasting members 26 whereby to bring the pasted area of the can over the forward edge of the uppermost label positioned on the follower 6 whereupon rotary movement is imparted to the can and the label wound thereabout. In the meantime paste from the receptacle 41 has been applied to the rear or lap end of said label, and by the continued rotary movement of the can over the runway 35—35ª, the lapped portions of the label on the can is presented uppermost and the can is held in this position by the stop 50 and the spring arms 39. The operator then presses the lapped portions of the labels together by his hands, especially the projecting edges of said label when the cans are released from the spring arms 39 and stop 50 and ride down the runway part 35ᵇ and meeting with the abutment 51 are held in position to be taken out by the operator and placed on the support 53. When positioned on said support 53 the clamp 56 is closed over the can and the projecting edges of the label are in position to be engaged by the folding mechanism in the manner above described.

We claim:—

1. In a can wrapping machine, the combination of a support adapted to support labels or wrappers of a width to overlie the ends of a can, label pick up pasting means, lap end pasting means to paste the lap end of the label substantially from edge to edge thereof, means for holding the can with the applied label whereby the projecting edges of the label may be pasted together at their lapped ends, and mechanism for folding said projecting edges against the ends of the can.

2. In a can wrapping machine, the combination of a support adapted to support labels or wrappers of a width to overlie the ends of a can, label pick up pasting means, lap end pasting means, means for engaging the can at a point where the lapped ends of the applied labels are in uppermost position whereby the projecting edges of said lapped end may be pasted together, and means for simultaneously folding both of said projecting edges against the ends of the can after said pasting operation.

3. In a can wrapping machine, the combination of a support adapted to support labels or wrappers of a width to overlie the ends of a can, label pick up pasting means, lap end pasting means, means for holding the can with the applied label whereby the projecting edges of the label may be pasted together at their lapped ends, mechanism for folding said projecting pasted edges against the ends of the can, and a can stop projecting upwardly from the runway at a point between said can holding means and folding mechanism.

4. In a machine of the character described, the combination of a runway, labeling and pasting instrumentalities to apply a label about the can with the edges of the label projecting beyond the ends of the can, folding mechanism adjacent the rear end of the runway, a can rest arranged to support the can when acted upon by the folding mechanism, and a can stop projecting upwardly from the runway at a point adjacent said folding mechanism.

5. In a machine of the character described, the combination of a runway, labeling and pasting instrumentalities to apply a label about the can with the edges of the label projecting beyond the ends of the can, folding mechanism adjacent the rear end of the runway, and a can stop projecting upwardly from the runway at a point between said instrumentalities and folding mechanism, the said runway having an inclined portion between said instrumentalities and can stop.

6. In a machine of the character described, a can runway, means for applying a label to the can with the edges projecting beyond the ends of the can, folding mechanism to fold the projecting edges of the label over the ends of the can, a can rest at one end of the runway for supporting the labeled can in operative position relative to the folding mechanism, a movable clamp coöperating with the rest to engage the can and hold the same stationary, and an outwardly projecting handle on said clamp.

7. In a machine of the character described, a can runway, means for applying a label to the can with the edges projecting beyond the ends of the can, folding mechanism to fold the projecting edges of the label over the ends of the can, a can rest at one end of the runway for supporting the labeled can in operative position relative to the folding mechanism, a segmental shaped clamp pivoted to the rest and adapted to swing to a position to engage partially around the can and coöperating with the rest to hold the can stationary while acted upon by the folding mechanism, and an elongated handle projecting rearwardly from said segmental clamp intermediate its ends and of a length to project beyond said folding mechanism.

8. In a machine of the character described, a can runway, means for applying a label to the can with the edges projecting beyond the ends of the can, folding mechanism to fold the projecting edges of the label over the ends of the can, a can rest at one end of the runway for supporting the labeled can in operative position relative to the folding mechanism, a segmental shaped clamp pivoted to the rest and adapted to swing to a position to engage partially around the can and coöperating with the rest to hold the can stationary while acted upon by the folding mechanism, an elongated handle projecting rearwardly from said segmental clamp intermediate its ends of a length to project beyond said folding mechanism, and an outstanding stop on the swinging clamp adjacent its pivotal connection adapted to engage the rest to limit the downward swinging movement of the clamp.

9. In a machine of the character described, the combination of means for supporting a can with the applied label projecting from one end of the same, means for folding said projecting end of the label against the end of the can comprising a plurality of folding fingers, said folding fingers having a reduced portion to overlie the usual annular end ridge or bead of the can, and means for actuating the fingers.

10. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, a rod carried by one head and having a sliding engagement with the other, a spring mounted on said rod between the heads and in operative engagement with the heads to oppositely move the heads in one direction and thereby actuate the fingers in one direction, and means acting in opposition to said spring to move the heads in a reverse direction so as to move the fingers in a reverse direction.

11. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, interposed springs adjacent opposite sides of the head, said springs being secured to one head and engaging a fixed projection on the other to oppositely move the heads in one direction and thereby actuate the fingers in one direction, and means acting in opposition to said spring to oppositely move the heads in a reverse direction so as to move the fingers in a reverse direction.

12. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, oppositely disposed outwardly projecting brackets on one head, rods carried by one head and having a sliding engagement with the said brackets, a spring mounted on each rod to oppositely move the heads in one direction and thereby actuate the fingers in one direction, means acting in opposition to said spring to move the heads in a reverse direction so as to move the fingers in a reverse direction, and means for rotating said heads when in one of said positions.

13. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, an interposed spring secured to one head and engaging a fixed projection on the other to oppositely move the heads in one direction and thereby actuate the fingers in one direction, means acting in opposition to said spring to oppositely move the heads in a reverse direction so as to move the fingers in a reverse direction, means for rotating said heads when in one of said positions, locking means interposed between the heads to retain the same in one of their relative positions, and means for slidably moving said heads together when in interlocked position.

14. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, a spring interposed between the heads to oppositely move the heads in one direction and thereby actuate the fingers in one direction, means acting in opposition to said spring to oppositely move the heads in a reverse direction so as to move the fingers in a reverse direction, locking means interposed between the heads to retain the same in one of their relative positions, and means for slidably moving the heads together when in interlocked position.

15. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary heads and fingers, spring means to oppositely move the heads in one direction and thereby actuate the fingers in one direction, means acting in opposition to said spring means to oppositely move the heads in a reverse direction so as to move the fingers in a reverse direction, locking means between the heads automatically operable to retain the heads in one of their relative positions, and means for slidably moving the heads together when in interlocked position.

16. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, a spring interposed between the heads to oppositetly move the heads in one direction and thereby actuate the fingers in one direction, means acting in opposition to said spring to oppositely move the heads in a reverse direction so as to move the fingers in a reverse direction, means for rotating the heads when in one position, and means for sliding the heads together when moved in an opposite direction.

17. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, a spring interposed between the heads to oppositely move the heads in one direction and thereby actuate the fingers in one direction, means acting in opposition to said spring to oppositely move the heads in a reverse direction so as to move the fingers in a reverse direction, means for rotating the heads when they are in relatively spaced position, interlocking means between the heads for holding the same together when in an opposite relative position, and means for sliding both heads together toward and from the end of the can when in the last mentioned position.

18. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, a spring interposed between the heads to oppositely move the heads in one direction and thereby actuate the fingers in one direction, means acting in opposition to said spring to oppositely move the heads in a reverse direction, means for rotating the heads when they are in relatively spaced position, automatically operable interlocking means between the heads for holding the same together when in an opposite relative position, and means for sliding both heads together toward and from the end of the can when in the last mentioned position.

19. In a machine of the character described, folding mechanism including a head, an annular series of folding fingers pivotally mounted on said head whereby to engage the outer surface of the projecting end of the label applied to the can whereby to fold said projecting end against the can end, an auxiliary head, said heads being mounted for relative sliding movement, a connection between said auxiliary head and fingers, a spring interposed between the heads to oppositely move the heads in one direction and thereby actuate the fingers in one direction, means acting in opposition to said spring to oppositely move the heads in a reverse direction, means for rotating the heads when they are in relatively spaced position, automatically releasable locking means between the heads for holding the same together when in an opposite relative position, and means for sliding both heads together toward and from the end of the can when in the last mentioned position.

20. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to the fingers, means for imparting slidable movement to both heads when in one of their relative positions, and interlocking means interposed between the heads for locking the same together during said simultaneous sliding movement.

21. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to the fingers, means for imparting slidable movement to both heads when in one of their relative positions, interlocking means interposed between the heads for locking the same together during said simultaneous sliding movement, and means for rotating the heads.

22. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to both heads, a lock carried by one head, and a coöperating engaging part carried by the other head, the lock being automatically operable to engage said part when the heads are in one relative position, and means for imparting sliding movement to the heads when locked together.

23. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to both heads, a lock carried by one head, a coöperating engaging part carried by the other head, the lock being automatically operable to engage said part when the heads are in one relative position, means for imparting sliding movement to the heads when locked together, and means for automatically releasing said lock.

24. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to the fingers, an elongated projecting locking arm carried by one head and adapted in one position of the heads to engage the other head to lock the heads together for simultaneous sliding movement, and means to engage said arm to release the heads.

25. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to the fingers, an elongated projecting locking arm carried by one head and adapted in one position of the heads to engage the other head to lock the heads together for simultaneous sliding movement, and means to engage said arm to release the heads, said means being operable by the movement of the head.

26. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to the fingers, an elongated projecting locking arm carried by one head and adapted in one position of the heads to engage the other head to lock the heads together for simultaneous sliding movement, spring means for actuating said arm in one direction to establish the locked connection, and a relatively fixed member to engage said arm to move the same against the action of the spring to release the heads.

27. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, means for moving the heads toward one another to impart one movement to the fingers, means for separating the heads to impart a reverse movement to the fingers, an elongated projecting locking arm carried by one head and adapted in one position of the heads to engage the other head to lock the heads together for simultaneous sliding movement, spring means for actuating said arm in one direction to establish the locked connection, a projection on the arm, and a fixed camway to be engaged by said projection in the movement of the heads to act in opposition to the spring to release the heads.

28. In a machine of the character described, the combination of means for supporting a can with an edge of the applied label projecting over the end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, a shaft connected to one head for moving the same toward the other to impart movement to the fingers in one direction about their pivot, a lock carried by one head to automatically engage the other head whereby simultaneous sliding movement may be imparted to said heads, an automatic release for the lock, and spring means acting on the release of the lock to force the heads apart and thereby impart a reverse movement to the folding fingers about their pivot and thereby fold the projecting edge of the label.

29. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, a shaft connected to one head for moving the same toward the other to impart movement to the fingers in one direction about their pivot, a lock carried by one head to automatically engage the other head whereby simultaneous sliding movement may be imparted to said heads, an automatic release for the lock, spring means acting on the release of the lock to force the heads apart and thereby impart a reverse movement to the folding fingers about their pivot and thereby fold the projecting edge of the label, and means for rotating the heads when said fingers reach the limit of said last mentioned movement.

30. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, a shaft connected to one head for moving the same toward the other to impart movement to the fingers, in one direction about their pivot, a lock carried by one head to automatically engage the other head whereby simultaneous sliding movement may be imparted to said heads, an automatic release for the lock, spring means acting on the release of the lock to force the heads apart and thereby impart a reverse movement to the folding fingers about their pivot to thereby fold the projecting edge of the label, and means for rotating the heads when said fingers reach the limit of said last mentioned movement, said fingers being rotatable about their own axis during said rotation of the head.

31. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, a shaft connected to one head for moving the same toward the other to impart movement to the fingers in one direction about their pivots, a bracket projecting from the supporting head adapted to slide through a recess in the actuating head, an elongated arm extending longitudinally of the bracket and pivoted intermediate its ends thereto, a spring for the arm, a lock part at one end of the arm adapted to under the action of the spring engage either head whereby simultaneous sliding movement may be imparted to the heads, means to engage the opposite end of the arm to automatically release the lock, and means for relatively moving the heads on the release of the lock.

32. In a machine of the character described, the combination of means for supporting a can with an edge of the applied label projecting over one end thereof, folding mechanism for said projecting edge of the label comprising a supporting head or frame and an actuating head or frame mounted for relative sliding movement, an annular series of folding fingers pivotally mounted on the supporting head for swinging movement whereby to fold the projecting edge of the label over the end of the can, an operative connection between said fingers and actuating head, a shaft connected to one head for moving the same toward the other to impart movement to the fingers in one direction about their pivots, a bracket projecting from the supporting head adapted to slide through a recess in the actuating head, an elongated arm extending longitudinally of the bracket and pivoted intermediate its ends thereto, a spring for the arm, a lock part at one end of the arm adapted to under the action of the spring engage either head whereby simultaneous sliding movement may be imparted to the heads, means to engage the opposite end of the arm to automatically release the lock, means for relatively moving the heads on the release of the lock, and means for rotating the heads when they reach the limit of the last mentioned movement.

33. In a machine of the character described, a can support, a vertically arranged supporting head, a cluster of folding fingers, means for supporting the fingers on the head including an arm projecting laterally from one side of the head, one for each finger, a link pivoted to the arm and normally projecting substantially parallel to the head, and a pivotal connection between the free end of the link and the finger intermediate the ends of the latter, and actuating means connected to the rear end of the finger for moving the same about its intermediate pivot to fold the projecting end of the label about the end of the can.

34. In a machine of the character described, a can support, a vertically arranged supporting head, a cluster of folding fingers, means for supporting the fingers on the head including an arm projecting laterally from one side of the head, a pivotal link on each arm for the fingers, and coöperating abutments on the link and arm.

35. In a machine of the character described, a can support, a vertically arranged supporting head, a cluster of folding fingers, means for supporting the fingers on the head including an arm projecting laterally from one side of the head, one for each finger, links pivoted at one end to the fingers and at the opposite end to said arms, and a spring interposed between each of said links and head.

36. In a machine of the character described, a can support, a vertically arranged supporting head, a cluster of folding fingers, means for supporting the fingers on the head including an arm projecting laterally from one side of the head, one for each finger, links one for each finger, the links being pivoted at one end to the fingers and at the opposite ends to said arms, a spring projecting from one side of the link and adapted to engage at its opposite end the head, and an abutment projecting from one side of the link to engage a fixed part of said arm.

37. In a machine of the character described, a cam support, a vertically arranged supporting head, a cluster of folding fingers, means for supporting the fingers on the head including an arm projecting laterally from one side of the head, one for each finger, a link pivoted to the arm and normally projecting substantially parallel to the head, a pivotal connection between the free end of the link and the finger intermediate the ends of the latter, and actuating means for the fingers including rearwardly projecting elongated arms pivoted at one end of the rear ends of said fingers, and means for imparting longitudinal sliding movement to said elongated arms.

38. In a machine of the character described, a can support, a vertically arranged supporting head, a cluster of folding fingers, means for supporting the fingers on the head including an arm projecting laterally from one side of the head, one for each finger, a link pivoted to the arm and normally projecting substantially parallel to the head, a pivotal connection between the free end of the link and the finger intermediate the ends of the latter, actuating means for the fingers including rearwardly projecting elongated arms pivoted at one end of the rear ends of said fingers, means for imparting longitudinal sliding movement to said arms, and means for simultaneously moving the arms laterally.

39. In a machine of the character described, a can support, a vertically arranged supporting head, a cluster of folding fingers, means for supporting the fingers on the head including an arm projecting laterally from one side of the head, one for each finger, a link pivoted to the arm and normally projecting substantially parallel to the head, a pivotal connection between the free end of the link and the finger intermediate the ends of the latter, actuating means for the fingers including rearwardly projecting elongated arms pivoted at one end of the rear ends of said fingers, a yieldable hanger on said arm constituting a pivotal connection for said fingers, and means for swinging said fingers about said pivotal connection.

40. In a machine of the character described, a cam support, a vertically arranged supporting head, a cluster of folding fingers, means for supporting the fingers on the head including an arm projecting laterally from one side of the head, one for each finger, a pivoted hanger on said arm constituting a pivotal connection for said fingers, spring holding means for the hangers, and means for swinging said fingers about said pivotal connection.

41. In a wrapping machine, the combination of a support adapted to hold a can with the edges of an applied label projecting beyond the ends of the can, rotatable heads adjacent opposite sides of said support, and folding members adapted to engage and fold the projecting edges of the label against the end of the can, said folding members being carried by the heads and comprising a series of conical shaped arms rotatable about their own axis, a common drive for both of said heads, and operatively associated actuating means for both of said heads, whereby opposite edges of the label may be simultaneously folded over the ends of the can.

42. In a wrapping machine, the combination of a support adapted to hold a can with the edges of an applied label projecting beyond the ends of the can, rotatable heads adjacent opposite sides of said support, and folding members adapted to engage and fold the projecting edges of the label against the end of the can, said folding members being carried by the heads and comprising a series of conical shaped arms rotatable about their own axis, and a series of coöperating spring fingers also carried by the head.

43. In a wrapping machine, the combination of a support adapted to hold a can with the edges of an applied label projecting beyond the ends of the can, rotatable heads adjacent opposite sides of said support, a cluster of folding fingers carried by each head adapted to fold the projecting edges of the label against the ends of the can, a longitudinally extending drive shaft projecting between said heads, and drive connections between said shaft and heads for simultaneously moving the same toward and from the can.

44. In a wrapping machine, the combination of a support adapted to hold a can with the edges of an applied label projecting beyond the ends of the can, rotatable heads adjacent opposite sides of said support, a cluster of folding fingers carried by each head adapted to fold the projecting edges of the label against the ends of the can, shaft supports for the heads, a longitudinally extending drive shaft common to both shafts, and drive connections interposed between said longitudinally extending shaft and the head shafts for simultaneously moving the same toward and from the can.

45. In a wrapping machine, the combination of a support adapted to hold a can with the edges of an applied label projecting beyond the ends of the can, rotatable heads adjacent opposite sides of said support, a cluster of folding fingers carried by each head adapted to fold the projecting edges of the label against the ends of the can, shaft supports for the heads, a longitudinally extending drive shaft common to both shafts, drive connections interposed between said longitudinally extending shaft and the head shafts for simultaneously moving the same toward and from the can, and associated means interposed between said longitudinally extending shaft and the head shafts for imparting rotary movement to the latter.

46. In a wrapping machine, the combination of a support adapted to hold a can with the edges of an applied label projecting beyond the ends of the can, rotatable heads adjacent opposite sides of said support, a cluster of folding fingers carried by each head adapted to fold the projecting edges of the label against the ends of the can, shaft supports for the heads, a longitudinally extending drive shaft common to both shafts, drive connections interposed between said longitudinally extending shaft and the head shafts for simultaneously moving the same toward and from the can including a cam, means on one of said parts comprising the longitudinal shaft head and shafts, and a coöperating shoe carried by the other of said parts.

47. In a wrapping machine, the combination of a support for holding a can with an applied label having the edges of the label projecting from one end of the can, of folding means for folding said projecting edge against the end of the can comprising a head having a cluster of folding fingers, a shaft for the head, an auxiliary drive shaft extending substantially parallel with the head shaft, a gear connection between the shafts whereby to impart rotary movement to the head, and a cam connection between the shafts whereby to impart sliding movement to the head.

48. In a wrapping machine, the combination of a support adapted to hold a can with the edges of an applied label projecting beyond the ends of the can, heads adjacent opposite sides of said support, a cluster of folding fingers carried by each head adapted to fold the projecting edges of the label against the ends of the can, shaft supports for the heads, a longitudinally extending drive shaft common to both shafts, drive connections interposed between said longitudinally extending shaft and the head shafts for simultaneously moving the same toward and from the can including a cam, means on one of said parts comprising the longitudinal shaft head and shafts, a coöperating shoe carried by the other of said parts, means for rotating the head, and breaking instrumentalities operatively associated with the heads.

49. In a machine of the character described, the combination of a support for cans having an applied label with the edges projecting from the end of the can, and means for folding said projecting edges against the can head or end comprising a rotary head, a cluster of arms carried by the head adapted to fold said projecting edges, a yieldable support for the cluster of arms and a yieldable support for each of said folding arms whereby the arms are independently yieldable.

50. In a machine of the character described, the combination of a support for cans having an applied label with the edges projecting from the end of the can, means for folding said projecting edges against the can head or end comprising a rotary head, a cluster of arms carried by the head adapted to fold said projecting edges, and a spring connected to each of said arms whereby they may independently yield.

51. In a machine of the character described, the combination of a support for cans having an applied label with the edges projecting from the end of the can, means for folding said projecting edges against the can head or end comprising a rotary head, a cluster of arms carried by the head adapted to fold said projecting edges, means for supporting the head whereby it is bodily yieldable, and means for supporting the arms whereby they are independently yieldable.

52. In a machine of the character described, the combination of a support for cans having an applied label with the edges projecting from the end of the can, means for folding said projecting edges against the can head or end comprising a rotary head a cluster of arms carried by the head adapted to fold said projecting edges, means for supporting the head whereby it is bodily yieldable, and a spring support for each arm whereby it is independently yieldable.

53. In a machine of the character described, the combination of a support for cans having an applied label with the edges projecting from the end of the can, means for folding said projecting edges against the can head or end comprising a rotary head, a cluster of arms carried by the head adapted to fold said projecting edges, the said arms being adapted to engage one surface of the label, and a series of coöperating yieldable fingers to engage the opposite surface of the labels when acted upon by said arms.

54. In a machine of the character described, the combination of a support for cans having an applied label with the edges projecting from the end of the can, means for folding said projecting edges against the can head, comprising a rotary head, a cluster of arms carried by the head adapted to fold said projecting edges, the said arms being adapted to engage one surface of the projecting edge label, and a series of coöperating elongated springs to engage over the opposite surface of the projecting edge of the labels and coöperating with said arms in the folding operation.

55. In a wrapping machine, the combination of a support adapted to hold a can with the edges of an applied label projecting beyond the ends of the can, heads adjacent opposite sides of said support, a cluster of folding fingers carried by each head adapted to fold the projecting edges of the label against the ends of the can, shaft supports for the heads, a longitudinally extending drive shaft common to both shafts, drive connections interposed between said longitudinally extending shaft and the head shafts for simultaneously moving the same toward and from the can including a cam, means on one of said parts comprising the longitudinal shaft head and shafts, a coöperating shoe carried by the other of said parts, means for rotating the head, and breaking instrumentalities operatively associated with the heads comprising a spring member controlled by a part carried by one of said head shafts.

56. In a wrapping machine, the combination of a head having a series of folding fingers adapted to engage projecting edges of a label applied to a can, a shaft support for the head, means for imparting independent rotary and sliding movements to the head, and an interposed shock absorbing means comprising a gear member mounted on the shaft and rotatable with the latter, an auxiliary shaft having a pinion in mesh with said gear, an abutment part sleeved upon the auxiliary shaft, a spring sleeved upon the auxiliary shaft and connected at one end to said pinion and at its opposite end to said abutment member, and a coöperating abutment part carried by the head shaft adapted to engage the abutment on the auxiliary shaft, substantially as and for the purpose described.

57. In a machine of the character described, a support for a can with an applied label having its edge projecting from the end of the can, means for folding said projecting edge comprising a head having a cluster of folding fingers, a shaft support for the head, a drive shaft extending longitudinally of the shaft support, means for imparting rotary movement to the drive shaft, a gear connection between the drive shaft and the head shaft, whereby to impart rotary movement to the head, the head shaft being also adapted to slide with its head, means for imparting sliding movement comprising a cam carried by the drive shaft, and a coöperating shoe carried by the head shaft, said cam being adapted in the rotary movement of the drive shaft to impart sliding movement to the head shaft.

58. In a machine of the character described, a support for a can with an applied label having its edge projecting from the end of the can, means for folding said projecting edge comprising a head having a cluster of folding fingers, a shaft support for the head, a drive shaft extending longitudinally of the shaft support, means for imparting rotary movement to the drive shaft, a gear connection between the drive shaft and the head shaft whereby to impart rotary movement to the head, the head shaft being also adapted to slide with its head, means for imparting sliding movement comprising a cam carried by the drive shaft, a coöperating shoe carried by the head shaft, said cam being adapted in the rotary movement of the drive shaft to impart sliding movement to the head shaft, and means for releasing the gear connection between the shafts during said sliding movement of the head shaft.

59. In a machine of the character described, the combination of a support for a can with the edge of an applied label projecting from the end of the can, means for folding said projecting edge against the end of the can comprising a head having a cluster of folding fingers, a shaft for the head, a drive shaft, a gear wheel carried by the drive shaft, a gear wheel carried by the head shaft, the said wheels having teeth adapted to intermesh and also having coöperating toothless smooth portions whereby when said teeth are in mesh the head shaft will be rotated by the drive shaft and whereby when said teeth are not in mesh the head shaft will be free from rotation, and means for imparting sliding movement to the head shaft when the toothless portions of the wheels are in engagement.

60. In a machine of the character described, the combination of a support for a can with the edge of an applied label projecting from the end of the can, means for folding said projecting edge against the end of the can comprising a head having a cluster of folding fingers, a shaft for the head, a drive shaft, a gear wheel carried by the drive shaft, a gear wheel carried by the head shaft, the said wheels having teeth adapted to intermesh and also having coöperating toothless smooth portions whereby when said teeth are in mesh the head shaft will be rotated by the drive shaft and whereby when said teeth are not in mesh the head shaft will be free from rotation, a disk member mounted upon the drive shaft and having a cam groove, and a relatively fixed coöperating shoe to engage said groove carried by the head shaft, the said parts being adapted to impart sliding movement to the head shaft when the toothless portion of the gear wheels are in registration.

61. In a machine of the character described, a can support, means for folding the projecting edge of an applied label over the end of the can, said support comprising a rotary head having a cluster of movable folding fingers adapted to engage the outer surface of the projecting edge of the label, and coöperating fingers adapted to engage the inner surface of the projecting edge of the label whereby to partially fold the projecting edge of the label, the folding arms being independently movable relative to the fingers whereby to complete the folding operation and compress the folds flat against the can end.

62. In a machine of the character described, a can support, means for folding a projecting edge of an applied label over the end of the can comprising a movable head, a plurality of movable folding arms carried by the head, and a plurality of coöperating yieldable arms also carried by the head.

63. In a machine of the character described, a can support, means for folding a projecting edge of an applied label over the end of the can comprising a movable head, a plurality of movable folding arms carried by the head, and a plurality of coöperating spring fingers also carried by the head.

64. In a machine of the character described, a support for cans with applied labels, the edge of which projects beyond the end of the can, means for folding said projecting edge against the end of the can comprising a rotary head, an annular series of folding members carried by the head and suitably mounted coöperating spring fingers.

65. In a machine of the character described the combination of a support for a can with the edge of an applied label projecting beyond the ends of the can, of means for folding the edge of the label against the end of the can comprising a rotary head, an annular series of members carried by the head and pivotally mounted, and an annular series of spring fingers arranged to coöperate with the pivoted members to fold the edge of the label against the end of the can.

66. In a machine of the character described the combination of a support for a can with the edge of an applied label projecting beyond the ends of the can, of means for folding the edge of the label against the end of the can comprising a rotatable head, movable folding members engaging over one surface of the projecting edge of the label, relatively fixed coöperating fingers engaging over the opposite surface of said projecting edge of the label, and means for imparting movement to said movable fingers.

67. In a machine of the character described, the combination of a support for a can with the edge of an applied label projecting beyond the ends of the can, of means for folding the edge of the label against the end of the can comprising a rotatable head, movable folding members engaging over one surface of the projecting edge of the label, relatively fixed coöperating fingers engaging over the opposite surface of said projecting edge of the label, and means for imparting movement to said movable fingers, said fingers being formed of yieldable material.

68. In a machine of the character described, the combination of a support for a can with the edge of an applied label projecting beyond the ends of the can, of means for folding the edge of the label against the end of the can comprising a rotatable head, movable folding members engaging over one surface of the projecting edge of the label, relatively fixed coöperating fingers engaging over the opposite surface of said projecting edge of the label, and means for imparting movement to said movable fingers, one of said fingers being arranged intermediate a pair of said folding members throughout the series.

69. In a machine of the character described the combination of a support for a can with the edge of an applied label projecting beyond the ends of the can, of means for folding the edge of the label against the end of the can comprising a rotatable head, movable folding members engaging over one surface of the projecting edge of the label, relatively fixed coöperating fingers engaging over the opposite surface of said projecting edge of the label, and means for imparting movement to said movable fingers, said fingers being formed of yieldable material and the fingers and members being arranged alternately upon the head.

70. In a machine of the character described, folding members, a carrying head, means for imparting rotary and sliding movements to the head, and interposed yieldable shock absorbing means operatively associated with said first mentioned means.

71. In a machine of the character described, folding members, a carrying head, means for imparting a slidable movement to the head and subsequently a rotary movement thereto, and spring associated shock absorbing means constructed and arranged to operate as the movement of the head is changed.

72. In a machine of the character described, folding members, a carrying head, cam actuated means for alternately imparting sliding and rotary movement to the head, and associated shock absorbing means, including a spring adapted to be put under tension in one of said movements and to be released on the subsequent movement.

73. In a machine of the character described, the combination of folding members, a carrying head therefor, means for alternately imparting sliding and rotary movement to the head including a gear, and spring shock absorbing means having a gear operatively connected with the first mentioned gear.

74. In a machine of the character described, folding members, a carrying head, means for alternately imparting sliding and rotary movement to the head, and an interposed spring brake operatively positioned in one of the movements of the head and adapted to be released in a subsequent movement thereof.

75. In a machine of the character described, means for folding the projecting edge of a label over the end of a can comprising a carrying head, oppositely acting folding members carried by the head adapted to engage over opposite surfaces of the projecting edge of the label to crimp or partially fold the labels, and associated means for completing the folding operation.

76. In a machine of the character described, means for folding the projecting edge of a label over the end of a can comprising a carrying head, oppositely acting folding members carried by the head adapted to engage over opposite surfaces of the projecting edge of the label to crimp or partially fold the labels, and associated means for completing the folding operation, the said members being arranged in annular series, and each one of said series being yieldable.

77. In a can wrapping machine, the combination of oppositely disposed folding heads adapted to fold the edges of labels over the ends of a can or the like, a support arranged intermediate the heads having a substantially segmental surface adapted to receive the can, and a coöperating segmental clamp member pivoted at one side to the upper edge of one side of the support and adapted to swing into a position overlying a can positioned on said support, and pressure exerting means for said clamp comprising a handle projecting therefrom, substantially as described.

78. In a machine of the character described, the combination of folding mechanism, a carrying head therefor, and means for alternately imparting rotary and sliding movement to the head including a shaft, driving means for the shaft, a gear carried by the shaft, a shock absorber spring, a gear operatively associated therewith, and arranged to mesh with the first mentioned gear, and means whereby in one movement of the head the spring will be placed under tension by said gears, and whereby, in a subsequent movement of the head the spring will be released.

79. In a machine of the character described, the combination of folding mechanism, a head therefor, gear means for imparting rotary movement to the head, cam means for imparting sliding movement to the head, a shock absorber, means operatively associated with the gear means for positioning the shock absorber, and means associated with the cam means for rendering the shock absorber operative as the movement of the head is changed.

In testimony whereof we affix our signatures in presence of two witnesses.

FREDERICK H. KNAPP.
WILLIAM H. LEISTER.

Witnesses:
D. HOWARD,
ANNA C. CASE.